US008861537B1

(12) United States Patent
Braithwaite et al.

(10) Patent No.: US 8,861,537 B1
(45) Date of Patent: Oct. 14, 2014

(54) BRIDGE AND CONTROL PROXY FOR UNIFIED COMMUNICATION SYSTEMS

(75) Inventors: Michael Braithwaite, Austin, TX (US); Tracy A. Bathurst, South Jordan, UT (US); Paul R. Bryson, Austin, TX (US); Peter H. Manley, Draper, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 33 days.

(21) Appl. No.: 13/297,542

(22) Filed: Nov. 16, 2011

Related U.S. Application Data (60) Provisional application No. 61/416,027, filed on Nov. 22, 2010.

(51) Int. Cl.
*H04L 12/66* (2006.01)

(52) U.S. Cl.
USPC ............................................. 370/401

(58) Field of Classification Search
None
See application file for complete search history.

(56) References Cited

U.S. PATENT DOCUMENTS

| 7,149,209 | B2 * | 12/2006 | Strandberg | 370/352 |
|---|---|---|---|---|
| 7,308,477 | B1 * | 12/2007 | Gress et al. | 709/206 |
| 2002/0172339 | A1 * | 11/2002 | Creswell et al. | 379/201.01 |
| 2003/0012348 | A1 * | 1/2003 | Skladman et al. | 379/88.13 |
| 2003/0164986 | A1 * | 9/2003 | Boire-Lavigne et al. | 358/400 |
| 2005/0068227 | A1 * | 3/2005 | Caspi et al. | 342/357.1 |
| 2005/0135383 | A1 * | 6/2005 | Shenefiel | 370/395.52 |
| 2006/0046712 | A1 * | 3/2006 | Shamp et al. | 455/426.1 |
| 2008/0137817 | A1 * | 6/2008 | Wilson et al. | 379/88.17 |
| 2008/0299948 | A1 * | 12/2008 | Rosener | 455/412.2 |
| 2009/0009343 | A1 * | 1/2009 | Boyer et al. | 340/573.1 |

* cited by examiner

*Primary Examiner* — Gregory Sefcheck
*Assistant Examiner* — Rina Pancholi
(74) *Attorney, Agent, or Firm* — TraskBritt, P.C.

(57) ABSTRACT

This disclosure describes a bridge and control proxy for unified communication systems. The bridge transmits and receives data from a unified communication system. In addition, the bridge transmits and receives data from a non-compatible device. The bridge translates the data between the unified communication system and the non-compatible device. The bridge stores selected data such as presence information for later use by the unified communication system and/or the non-compatible device. Further, the bridge uses Web services to discover, promote, and/or advertise non-compatible devices to the unified communication system.

14 Claims, 7 Drawing Sheets

BRIDGE AND CONTROL PROXY FOR UNIFIED COMMUNICATION SYSTEMS

CROSS REFERENCE TO RELATED APPLICATION

This application claims priority and the benefits of the earlier filed Provisional U.S. Patent Application Ser. No. 61/416,027, filed 22 Nov. 2010, which is incorporated by reference for all purposes into this specification.

TECHNICAL FIELD

This disclosure relates to unified communication systems. More specifically, this disclosure invention relates to a bridge and control proxy for unified communication systems.

BACKGROUND ART

Unified communication is a technique that a number of equipment manufacturers such as CISCO®, AVAYA®, HP®, POLYCOM®, MICROSOFT® (UCS, now called LYNC®) and others use to make email, phone, and instant messaging (IM) clients compatible and easier to use. The goal of unified communication is to enable users to reach and collaborate more timely with remote and mobile co-workers, decision makers, and customers, which improves productivity and efficiency and results in better communication and faster decision-making. Unified communication creates the opportunity to experience these benefits through the integration of real-time communications services including: video & audio conferencing, scheduling, whiteboards, presence/IM, unified messaging, VoIP providing, P2P voice, and PSTN termination/origination.

Today, unified communications is a vibrant technology, yet it is mired in a fragmented ecosystem. The goal of a seamless company-to-company communications (inter-domain federation), as well as that within a company (intra-domain federation), from one vendor's equipment to another remains elusive. To fully realize the opportunity that exists for unified communication, inter-vendor interoperability must be addressed within the industry.

The challenges to interoperability are compounded by the unified communication industry emerging from the communications industry silos that have materialized over the last 50 years. The various unified communication vendors all have their historical roots in different aspects of communications (e.g., telephony, video, devices, etc.) and are struggling to remain relevant in the unified communication era where few vendors provide an end-to-end solution. Even those vendors whom offer a full suite of unified communication products, find that their customers have existing investments in a range of vendor equipment within their technology portfolios.

The various unified communication implementations from a number of vendors present similar functionality and user experiences yet the underlying technologies are diverse, supporting multiple protocols that include: XMPP; SIMPLE for IM/P; H.323, SIP, XMPP/Jingle for Voice & Video. Additionally, there are disparate protocols for Data Conferencing Multiple Codec's used for voice and video: e.g., G.711/729, H.263/264, etc. Finally, there are many proprietary media stack implementations addressing IP packet loss, jitter and latency in different ways.

Unified communications (UC) is the integration of real-time communication services such as instant messaging (chat), presence information, telephony (including IP telephony), video conferencing, call control and speech recognition with non-real-time communication services such as unified messaging (integrated voicemail, email, SMS and fax). UC is not a single product, but a set of products that provides a consistent unified user interface and user experience across multiple devices and media types.

UC also refers to a trend to offer business process integration, i.e., to simplify and integrate all forms of communications to optimize business processes and reduce the response time, manage flows, and eliminate device and media dependencies.

UC allows an individual to send a message on one medium and receive the same communication on another medium. For example, one can receive a voicemail message and choose to access it through email or a cell phone. If the sender is online according to the presence information and currently accepts calls, the response can be sent immediately through text chat or video call. Otherwise, it may be sent as a non real-time message that can be accessed through a variety of media.

UC is an evolving communications technology architecture which automates and unifies all forms of human and device communications in context, and with a common experience. Its purpose is to optimize business processes and enhance human communications by reducing latency, managing flows, and eliminating device and media dependencies.

Unified communications represents a concept where multiple modes of business communications can be seamlessly integrated. Unified communications is not a single product but rather a solution that consists of various elements, including, but not limited to, the following: call control and multi-modal communications, presence, instant messaging, unified messaging, speech access and personal assistant, conferencing, collaboration tools, mobility, business process integration (BPI) and a software solution to enable business process integration.

The term "presence" is also a factor—knowing where one's intended recipients are and if they are available, in real time—and is, itself, a key component of unified communications. Simply put, unified communications integrates all the systems that a user might already be using and helps those systems work together in real time. For example, unified communications technology could allow a user to seamlessly collaborate with another person on a project, even if the two users are in separate locations. The user could quickly locate the necessary person by accessing an interactive directory, engage in a text messaging session, and then escalate the session to a voice call, or even a video call—all within minutes. In another example, an employee receives a call from a customer whom has a question. Unified communications could enable that worker to access a real-time list of available expert colleagues, then make a call that would reach the necessary person, enabling the employee to answer the customer faster, and eliminating rounds of back-and-forth emails and phone-tag.

The examples in the previous paragraph primarily describe "personal productivity" enhancements that tend to benefit the individual user. While such benefits can be important, enterprises are finding that they can achieve even greater impact by using unified communications capabilities to transform business processes. This is achieved by integrating UC functionality directly into the business applications using development tools provided by many of the suppliers. Instead of the individual user invoking the UC functionality to, for example, find an appropriate resource, the workflow or process application automatically identifies the resource at the point in the business activity where one is needed.

When used in this manner, the concept of presence often changes. Most people associate presence with instant messaging (IM "buddy lists") the status of individuals is identified. But, in many business process applications, what is important is finding someone with a certain skill. In these environments, presence will identify available skills or capabilities.

This "business process" approach to integrating UC functionality can result in bottom line benefits that are an order of magnitude greater than those achievable by personal productivity methods alone.

Given the sophistication of unified communications technology, its uses are myriad for businesses. It enables users to know where their colleagues are physically located (say, their car or home office). They also have the ability to see which mode of communication the recipient prefers to use at any given time (perhaps their cell phone, or email, or instant messaging). A user could seamlessly set up a real-time collaboration on a document they are producing with a co-worker, or, in a retail setting, a worker might do a price-check on a product using a hand-held device and need to consult with a co-worker based on a customer inquiry. With unified communications, instant messaging and presence could be built into the price check application, and the problem could be resolved in moments.

SIP

The session initiation protocol (SIP) is an IETF-defined signaling protocol, widely used for controlling multimedia communication sessions such as voice and video calls over Internet protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games.

SIP was originally designed by Henning Schulzrinne and Mark Handley starting in 1996. The latest version of the specification is RFC 3261 from the IETF Network Working Group.

In November 2000, SIP was accepted as a 3GPP signaling protocol and permanent element of the IP Multimedia Subsystem (IMS) architecture for IP-based streaming multimedia services in cellular systems.

The SIP protocol is an application layer protocol designed to be independent of the underlying transport layer; it can run on transmission control protocol (TCP), user datagram protocol (UDP), or stream control transmission protocol (SCTP). It is a text-based protocol, incorporating many elements of the hypertext transfer protocol (HTTP) and the simple mail transfer protocol (SMTP).

SIP employs design elements similar to the HTTP request/response transaction model.

Each transaction consists of a client request that invokes a particular method or function on the server and at least one response. SIP reuses most of the header fields, encoding rules and status codes of HTTP, providing a readable text-based format.

SIP works in concert with several other protocols and is only involved in the signaling portion of a communication session. SIP clients typically use TCP or UDP on port numbers 5060 and/or 5061 to connect to SIP servers and other SIP endpoints. Port 5060 is commonly used for non-encrypted signaling traffic whereas port 5061 is typically used for traffic encrypted with transport layer security (TLS). SIP is primarily used in setting up and tearing down voice or video calls. It has also found applications in messaging applications, such as instant messaging, and event subscription and notification. There are a large number of SIP-related Internet engineering task force (IETF) documents that define behavior for such applications. The voice and video stream communications in SIP applications are carried over another application protocol, the real-time transport protocol (RTP). Parameters (port numbers, protocols, codecs) for these media streams are defined and negotiated using the session description protocol (SDP), which is transported in the SIP packet body.

A motivating goal for SIP was to provide a signaling and call setup protocol for IP-based communications that can support a superset of the call processing functions and features present in the public switched telephone network (PSTN). SIP by itself does not define these features; rather, its focus is call-setup and signaling. However, it was designed to enable the construction of functionalities of network elements designated proxy servers and user agents. These are features that permit familiar telephone-like operations: dialing a number, causing a phone to ring, hearing ringback tones or a busy signal. Implementation and terminology are different in the SIP world but to the end-user, the behavior is similar.

SIP-enabled telephony networks can also implement many of the more advanced call processing features present in signaling system 7 (SS7), though the two protocols themselves are very different. SS7 is a centralized protocol, characterized by a complex central network architecture and "dumb endpoints" (traditional telephone handsets). SIP is a peer-to-peer protocol, thus it requires only a simple (and thus scalable) core network with intelligence distributed to the network edge, embedded in endpoints (terminating devices built in either hardware or software). SIP features are implemented in the communicating endpoints (i.e., at the edge of the network) contrary to traditional SS7 features, which are implemented in the network.

Although several other VoIP signaling protocols exist, SIP is distinguished by its proponents for having roots in the IP community rather than the telecommunications industry. SIP has been standardized and governed primarily by the IETF, while other protocols, such as H.323, have traditionally been associated with the International Telecommunication Union (ITU).

The first proposed standard version (SIP 2.0) was defined by RFC 2543

SIP Network Elements

SIP user agent (UA) is a logical network end-point used to create or receive SIP messages and thereby manage a SIP session. A SIP UA can perform the role of a user agent client (UAC), which sends SIP requests, and the user agent server (UAS), which receives the requests and returns a SIP response. These roles of UAC and UAS only last for the duration of a SIP transaction.

A SIP phone is a SIP user agent that provides the traditional call functions of a telephone, such as dial, answer, reject, hold/unhold, and call transfer.

SIP phones may be implemented by dedicated hardware controlled by the phone application directly or through an embedded operating system (hardware SIP phone) or as a softphone, a software application that is installed on a personal computer or a mobile device, e.g., a personal digital assistant (PDA) or cell phone with IP connectivity. As vendors increasingly implement SIP as a standard telephony platform, often driven by 4G efforts, the distinction between hardware-based and software-based SIP phones is being blurred and SIP elements are implemented in the basic firmware functions of many IP-capable devices. Examples are devices from NOKIA® and RESEARCH IN MOTION®.

Each resource of a SIP network, such as a User Agent or a voicemail box, is identified by a uniform resource identifier (URI), based on the general standard syntax also used in Web services and email. A typical SIP URI is of the form: sip: username:password@host:port. The URI scheme used for SIP is sip: If secure transmission is required, the scheme sips: is used and SIP messages must be transported over Transport Layer Security (TLS).

In SIP, as in HTTP, the user agent may identify itself using a message header field "User-Agent," containing a text description of the software/hardware/product involved. The User-Agent field is sent in request messages, which means that the receiving SIP server can see this information. SIP network elements sometimes store this information, and it can be useful in diagnosing SIP compatibility problems.

SIP also defines server network elements. Although two SIP endpoints can communicate without any intervening SIP infrastructure, which is why the protocol is described as peer-to-peer, this approach is often impractical for a public service.

RFC 3261 Defines these Server Elements:
A proxy server "is an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy server interprets, and, if necessary, rewrites specific parts of a request message before forwarding it."
"A registrar is a server that accepts REGISTER requests and places the information it receives in those requests into the location service for the domain it handles."
"A redirect server is a user agent server that generates 3xx responses to requests it receives, directing the client to contact an alternate set of URIs. The redirect server allows SIP Proxy Servers to direct SIP session invitations to external domains."
The RFC specifies: "It is an important concept that the distinction between types of SIP servers is logical, not physical."
Other SIP related network elements are Session border controllers (SBC), they serve as middle boxes between UA and SIP server for various types of functions, including network topology hiding, and assistance in NAT traversal.

Various types of gateways or bridges at the edge between a SIP network and other networks (as a phone network).

SIP Messages

SIP is a text-based protocol with syntax similar to that of HTTP. There are two different types of SIP messages: requests and responses. The first line of a request has a method, defining the nature of the request, and a Request-URI, indicating where the request should be sent.

The first line of a response has a response code.

For SIP requests, RFC 3261 defines the following methods:
REGISTER: Used by a UA to indicate its current IP address and the URLs for which it would like to receive calls.
INVITE: Used to establish a media session between user agents.
ACK: Confirms reliable message exchanges.
CANCEL: Terminates a pending request.
BYE: Terminates a session between two users in a conference.
OPTIONS: Requests information about the capabilities of a caller, without setting up a call.

The SIP response types defined in RFC 3261 fall in one of the following categories:
Provisional (1xx): Request received and being processed.
Success (2xx): The action was successfully received, understood, and accepted.
Redirection (3xx): Further action needs to be taken (typically by sender) to complete the request.
Client Error (4xx): The request contains bad syntax or cannot be fulfilled at the server.
Server Error (5xx): The server failed to fulfill an apparently valid request.
Global Failure (6xx): The request cannot be fulfilled at any server.

SIP Transactions

SIP makes use of transactions to control the exchanges between participants and deliver messages reliably. The transactions maintain an internal state and make use of timers. Client Transactions send requests and Server Transactions respond to those requests with one-or-more responses. The responses may include zero-or-more Provisional (1xx) responses and one-or-more final (2xx-6xx) responses.

Transactions are further categorized as either Invite or Non-Invite. Invite transactions differ in that they can establish a long-running conversation, referred to as a dialog in SIP, and so include an acknowledgment (ACK) of any non-failing final response (e.g., 200 OK).

Because of these transactional mechanisms, SIP can make use of un-reliable transports such as user datagram protocol (UDP).

If we take the above example, User1's UAC uses an invite client transaction to send the initial INVITE (1) message. If no response is received after a timer controlled wait period the UAC may have chosen to terminate the transaction or retransmit the INVITE. However, once a response was received, User1 was confident the INVITE was delivered reliably. User1's UAC then must acknowledge the response. On delivery of the ACK (2) both sides of the transaction are complete. And in this case, a Dialog may have been established.

IM and Presence

The session initiation protocol for instant messaging and presence leveraging extensions (SIMPLE) is the SIP-based suite of standards for instant messaging and presence information. MSRP (message session relay protocol) allows instant message sessions and file transfer.

Many VoIP phone companies allow customers to use their own SIP devices, as SIP-capable telephone sets, or softphones. The market for consumer SIP devices continues to expand, there are many devices such as SIP terminal adapters, SIP gateways, etc.

The free software community started to provide more and more of the SIP technology required to build both end points as well as proxy and registrar servers leading to a commoditization of the technology, which accelerates global adoption. As an example, the open source community at SIP-foundry actively develops a variety of SIP stacks, client applications and SDKs, in addition to entire private branch exchange (IP PBX) solutions that compete in the market against mostly proprietary IP PBX implementations from established vendors.

The National Institute of Standards and Technology (NIST), Advanced Networking Technologies Division provides a public domain implementation of the JAVA Standard for SIP JAIN-SIP which serves as a reference implementation for the standard. The stack can work in proxy server or user agent scenarios and has been used in numerous commercial and research projects. It supports RFC 3261 in full and a number of extension RFCs including RFC 3265.

SIP-enabled video surveillance cameras can make calls to alert the owner or operator that an event has occurred, for example to notify that motion has been detected out-of-hours in a protected area.

Other protocols used in the UC Bridge are H.264 SVC (scalable video coding) is a compression standard that enables video conferencing systems to achieve highly error resilient IP video transmission over the public Internet without quality of service enhanced lines. This standard has enabled wide scale deployment of high definition desktop video conferencing and made possible new architectures which reduce latency between transmitting source and receiver, resulting in fluid communication without pauses.

In addition, an attractive factor for IP videoconferencing is that it is easier to set-up for use with a live videoconferencing call along with Web conferencing for use in data collaboration. These combined technologies enable users to have a much richer multimedia environment for live meetings, collaboration and presentations.

Today, most vendors provide some but not all unified communication products or services and have expertise in different areas of the communications. The result is a fragmented marketplace.

SUMMARY OF INVENTION

This disclosure describes a bridge and control proxy for unified communication systems. The bridge transmits and receives data from a unified communication system. In addition, the bridge transmits and receives data from a non-compatible device. The bridge translates the data between the unified communication system and the non-compatible device. The bridge stores selected data such as presence information for later use by the unified communication system and/or the non-compatible device.

Further, the bridge uses Web services to discover, promote, and/or advertise non-compatible devices to the unified communication system.

BRIEF DESCRIPTION OF DRAWINGS

To further aid in understanding the disclosure, the attached drawings help illustrate specific features of the disclosure and the following is a brief description of the attached drawings:

FIG. 3 is a view of an embodiment of the invention. A bridge 300 comprises a computer system 310 with network capability. A program storage device is readable by a computing device that tangibly embodies a program of instructions executable by the computing device to perform a method to use a bridge and control proxy for unified communication systems. The method comprises transmitting and receiving data from the unified communication system. The method also comprises transmitting and receiving data from the unified communication system. The method further comprises translating the data between the unified communication system and the non-compatible device. The method also comprises translating the data between the unified communication system and the non-compatible device. The method further comprises storing selected data such as presence information for later use by the unified communication system and/or the non-compatible device. In addition, the bridge 300 will have one or more application servers 320 to provide communication between the unified communication system and the non-compatible systems.

DISCLOSURE OF EMBODIMENTS

This disclosure describes a bridge and control proxy for unified communication systems. This disclosure describes numerous specific details in order to provide a thorough understanding of the present invention. One skilled in the art will appreciate that one may practice the present invention without these specific details. Additionally, this disclosure does not describe some well-known items in detail in order not to obscure the present invention.

This invention bridges the current state of unified communications by extending these systems within the enterprise and/or home to non-unified communications systems as HVAC, Security, Audio and Video distribution including interactive digital signage including controls and audio/video back channels.

Figure 1:
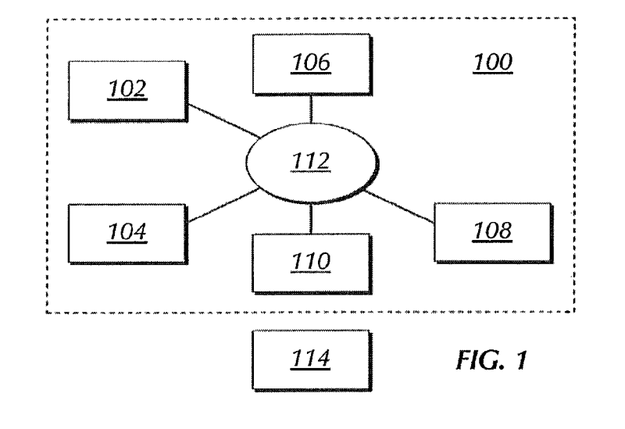
FIG. 1 illustrates a typical unified communication system.

FIG. 1 illustrates a typical unified communication system. A typical unified communication system 100 may include one or more of the following components: email server 102, fax server 104, telephone system 106 (this system may also include voicemail and video teleconferencing), instant messaging 108, other systems 110 such as digital presence systems or systems that may in the future be part of a typical unified communication system. All of these components will communicate with each other over a LAN or WAN (such as the Internet) 112 environment. One embodiment for unified communication system 100 is that all of the components reside on the same server or cluster of servers. Another embodiment for unified communication system 100 is for all of the components to be located in the Internet "cloud." At the present time, non-compatible unified communication systems 114 are unable to communicate and/or participate with a unified communication system 100.

Figure 2:
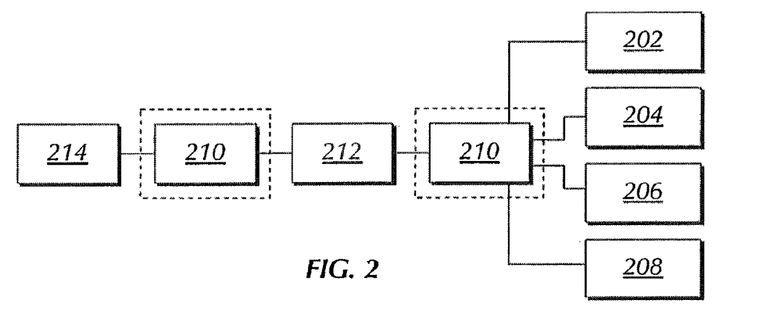
FIG. 2 illustrates an embodiment of the invention coupling non-compatible systems to a unified communication system.

FIG. 2 illustrates an embodiment of the invention coupling non-compatible systems to a unified communication system. The disclosed invention is a bridge and control proxy 212 (hereinafter bridge 212) for a unified communication system 214. The bridge 212 couples to systems that are not compatible with the unified communication system 214. These non-compatible include HVAC systems 202, security systems 204, audio/video distribution systems 206, and other non-compatible systems 208. These non-compatible systems communication with the bridge 212 through a LAN or WAN connection 210. One embodiment of the invention provides for the bridge 212 to couple to non-compatible systems through non-network type connections such as a serial connection, direct connection, USB connection, IR connection, or the like. The bridge 212 typically connects to the unified communication system 214 through a LAN or WAN connection 210.

The bridge 212 also provides Web services such as auto discovery of other IP devices, and advertising of state machine, and presence signaling and potential transcription.

Intelligent agents act as super translation scripts and can change the audio or text to any language to support far end needs with voice to text, and text to voice applications.

In addition, the disclosed invention can provide for adjustment of far end lighting control needs.

Figure 3:
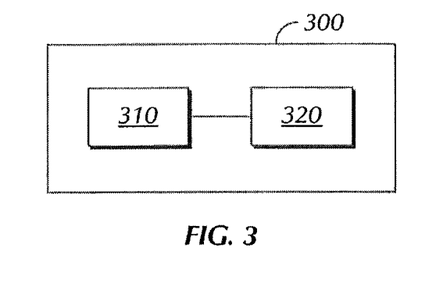

FIG. 3 is a more detailed view of an embodiment of the invention. A bridge 300 comprises a computer system with network capability 310. In addition, the bridge 300 will have one or more application servers 320 to provide communication between the unified communication system and the non-compatible systems.

In addition, the disclosed invention translates these and other data into other non-UC formats, and vice versa. For example, an IM can be used by the digital signage via the bridge. In addition, other unified communication services can be used through the bridge as well, e.g., RSS feeds, TWITTER® feeds, or other social media.

In one embodiment, this disclosure describes a bridge and control proxy for unified communication systems. The bridge transmits and receives data from a unified communication system. In addition, the bridge transmits and receives data from a non-compatible device. The bridge translates the data between the unified communication system and the non-compatible device. The bridge stores selected data such as presence information for later use by the unified communication system and/or the non-compatible device. Further, the bridge uses Web services to discover, promote, and/or advertise non-compatible devices to the unified communication system.

Another embodiment of the present invention can be found in Appendix A, which describes a media streaming solution by the assignee of this invention that is code named "Diamond Fork."

Figure 4:
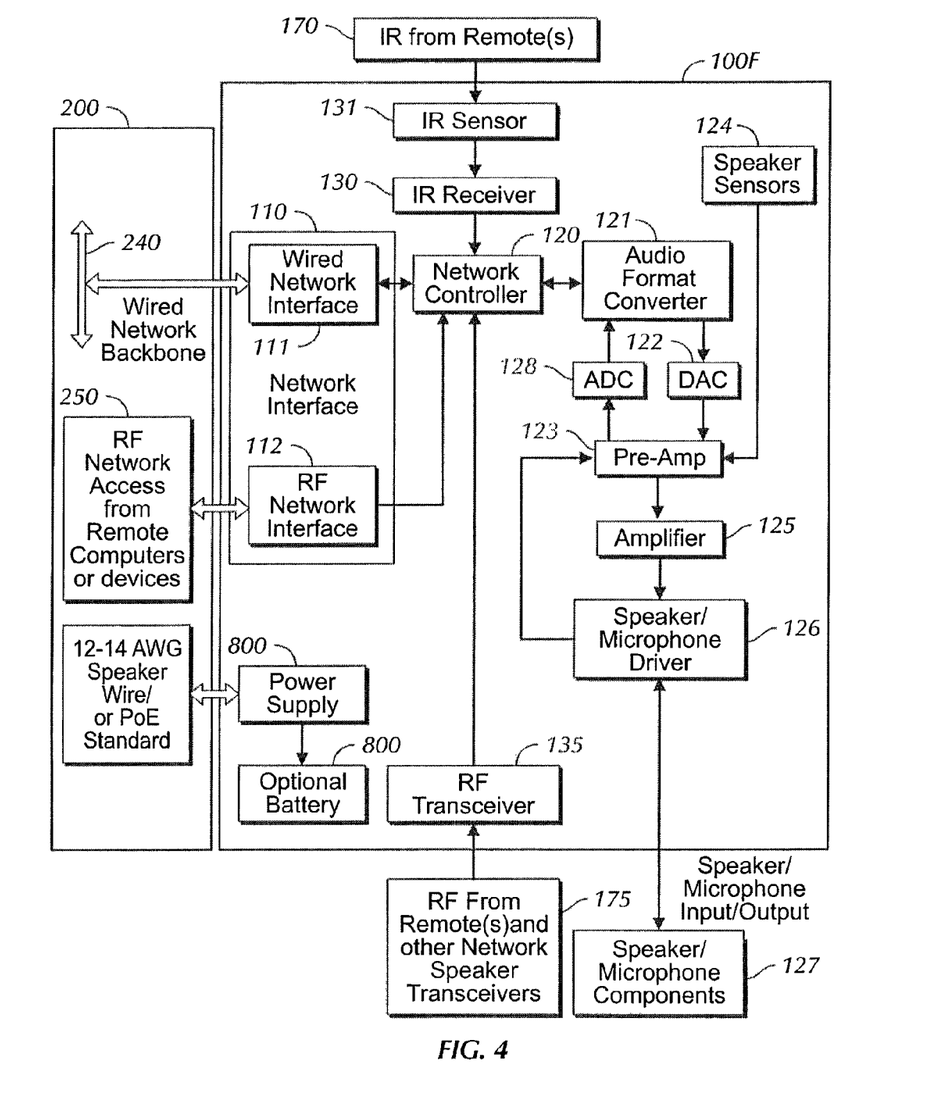
FIG. 4 is a block diagram of a networked enabled input and output device in an audio/video distribution system accessible through the disclosed invention.

FIG. 4 is a block diagram of a networked enabled input and output device in an audio/video distribution system that is an example of a non-compatible system that can be accessed by a unified communication system through the bridge of the disclosed invention. The network enabled input and output device 100F is part of the STREAMNET™ technology by CLEARONE® Communications Inc. that is better described in more detail in the following patents and applications: U.S. Pat. No. 7,643,894; U.S. patent application Ser. Nos. 11/467,340; 11/960,401; 12/015,385; 12/418,267; 12/727,925; 12/900,666; 12/917,765; and 12/917,773; all of which are incorporated by reference for all purposes into this specification.

Returning now to FIG. 4, a network input and output device 100F can receive DC current from external regulated power supplies over existing 14-18 AWG speaker wire or can employ PoE (Power over Ethernet) technology to trickle charge the battery. Also, charge status can be provided for battery 800.

The network input and output device 100F has power applied as DC current from a rechargeable battery source 800 either located within the speaker or inserted into the speaker as a removable battery pack. This would also allow for line power status, which would perform a function specific to the application once this condition occurs.

Controller 120 is an embedded controller with Flash memory programmed to function as a Web server. The controller 120 and an audio format converter 121 are enabled to allow their application programming to be updated over the network, the network speaker can be made to play currently unknown digital formats in the future.

The digital-to-analog converter 122, converts a digital input into an analog level output. At pre-amp 123, the analog signal is adjusted and filtered, and any desired active or electronic crossover may be performed. An amplifier 125 is comprised of one or more amplifier circuits that amplify the audio signal to the desired final signal strength. A speaker/microphone driver 126 is comprised of one or more speaker drivers circuits. Using multiple drivers for multiple speakers allows the speakers to be optimized for the frequency range received. Speaker/microphone components 127 convert the signal to sound and are voiced and designed to handle a wide dynamic range of audio frequencies and are able to aid in the accurate reproduction of sound from a digital source.

Figure 5:
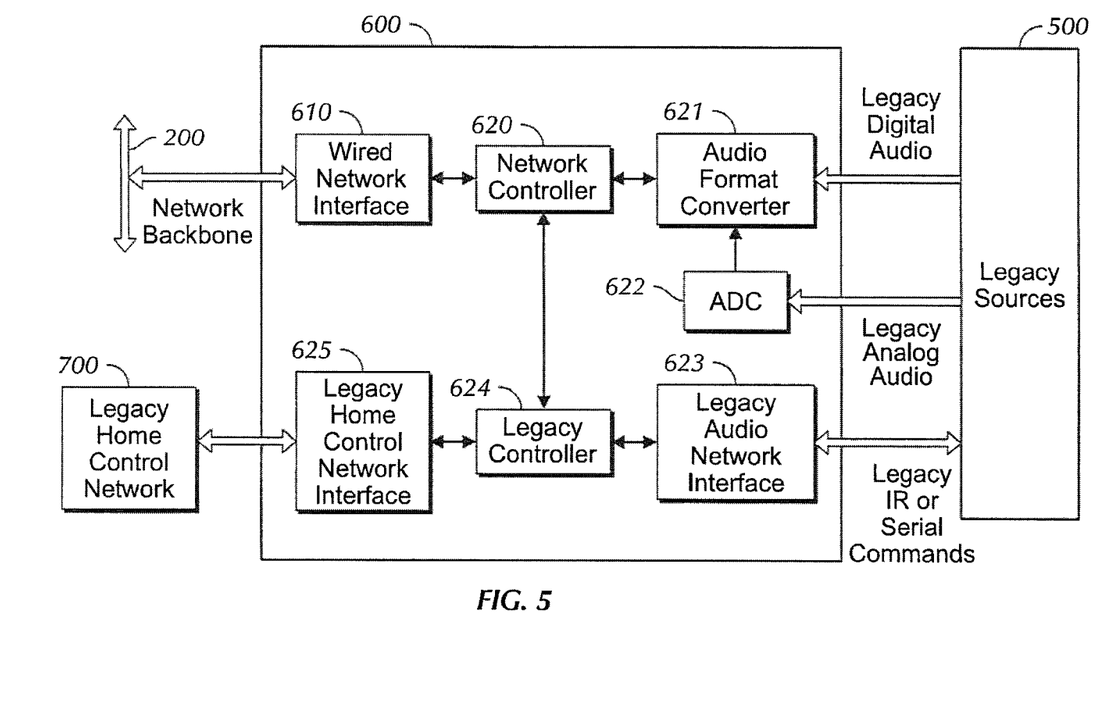
FIG. 5 is a block diagram of an networked enabled audio and video legacy control system in an audio/video distribution system accessible through the disclosed invention.

FIG. 5 is a block diagram of a networked enabled audio and video legacy control system 600 in an audio/video distribution system accessible through the disclosed invention. The audio and video legacy control system 600 communicates with the network backbone (Ethernet) 200 through a network interface 610 that handles the physical layer hardware protocol and may connect to one or more physical layers, wired or unwired or both. Coupled to the network interface 610 is a network controller 620 that provides the intelligence to run various application features of the audio and video legacy control system 600, including the higher levels of the TCP/IP protocol. The network controller 620 controls an audio format converter 621, which converts the legacy source audio into the desired network digital format for distribution. Digital audio from legacy sources 500 are transmitted directly to the audio format converter 621 to be re-formatted into the desired digital format. Analog audio from legacy sources 500 are fed to an analog-to-digital converter ("ADC") 622, and the resultant digitized signal then goes to the audio format converter 621 to be coded into the desired digital format. The network controller 620 takes the properly formatted digital audio and sends it to the network 200 via the network interface 610. Also, the audio format converter 621 may consist of multiple encoders to provide multiple conversions of different legacy audio inputs simultaneously. The audio and video legacy control system 600 uses the analog video from the legacy source device for encoding to a packet switched digital format such as WMAPro "Corona," and also uses the analog video inputs for power status and feedback.

The network interface 610 can use a standard wired interface such as the various Ethernet standards. In addition, network interface 610 can use wireless technology and protocols such as 802.11x, UWB, BLUETOOTH®, and more.

The network controller 620 is an embedded controller with Flash memory programmed to function as a Web server and enabled with the audio format converter 621 to allow their application programming to be updated over the network, the audio and video legacy control system 600 can be made to code audio to currently unknown digital formats in the future. The audio format converter 621 performs audio data compression and encoding of audio formats into the audio format acceptable for distribution to the end receiver on the network and can consist of an audio encoder-decoder chip (CODEC).

The analog-to-digital converter 622, commonly referred to as an ADC, converts an analog level input to a digital output. Adding a microphone speaker input to the ADC will enable voice control of the audio and video legacy control system 600 and would enable the system to record audio input for later use as system messages or audio feedback. Depending on the software application and programming in the network controller 620, the audio input may be stored locally for future audio feedback, used locally, or it may be fed out to the network through the network interface 610. The audio input could be used with a voice recognition application to initiate spoken audio or home control commands.

The audio and video legacy control system 600 may also communicate with the legacy sources 500 using a legacy communication method, such as IR or serial commands, that are understood by the legacy device. The network controller 620 controls and communicates with a legacy controller 624, which also communicates with the legacy source 500 through a legacy audio network interface 623. The functions of the network controller 620 and the legacy controller can be combined into one embedded controller.

The audio and video legacy control system 600 may also communicate with the legacy home control network 700 using the network communication method understood and practiced by the legacy home control network 700 and such communication may vary greatly depending on the legacy home control network 700 being used. The legacy controller 624 controls and communicates via a legacy home control network interface 625, with a legacy home control network 700. The functions of the legacy controller in controlling the legacy sources 500 and the legacy home control network 700 and the legacy controller could be separated out into two separate embedded controllers, or combined with the network controller 620.

Figure 6:
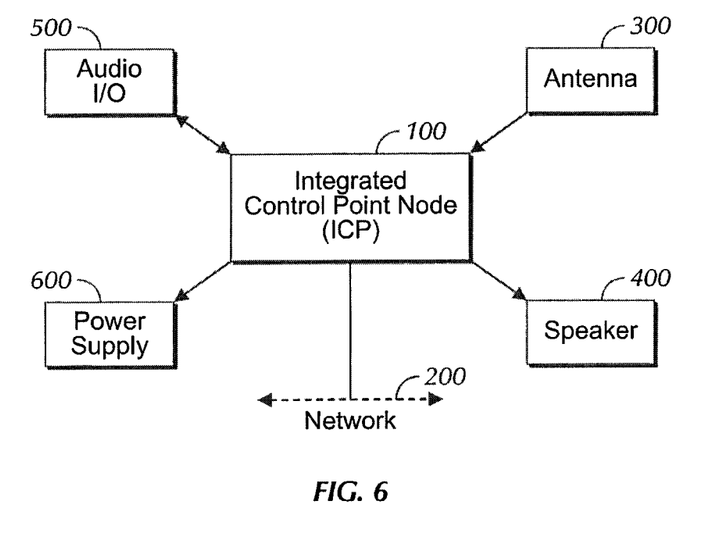
FIG. 6 is a block diagram of an integrated control point node for an audio/video distribution system accessible through the disclosed invention.

FIG. 6 is a block diagram of an Integrated Control Point Node for an audio/video distribution system that is an example of a non-compatible system that can be accessed by a unified communication system through the bridge of the disclosed invention. The integrated control point node (ICPN) 100 is part of the DigiLinX technology by CLEARONE® Communications Inc. that is better described in more detail in the following patents and applications: U.S. Pat. No. 7,711,126; and U.S. patent application Ser. No. 12/761,506; all of which are incorporated by reference for all purposes into this specification.

Analog and digital audio signals are received by the ICPN 100 via an Audio I/O node 500 and a network 200. The received analog and/or digital audio signals are created by or transcoded by the ICPN 100 and available for use remotely from the ICPN 100 via the audio I/O node 500 and the network 200. Terrestrial radio frequencies for use in the ICPN 100 also are received via an antenna. Power is supplied to the ICPN 100 by a power supply 600. The ICPN 100 provides powerful amplified signals to drive the transduction in connected speakers 400. In addition, the ICPN 100 can transmit and receive data from the network backbone 200 via connections, which can be wired or wireless.

Figure 7:
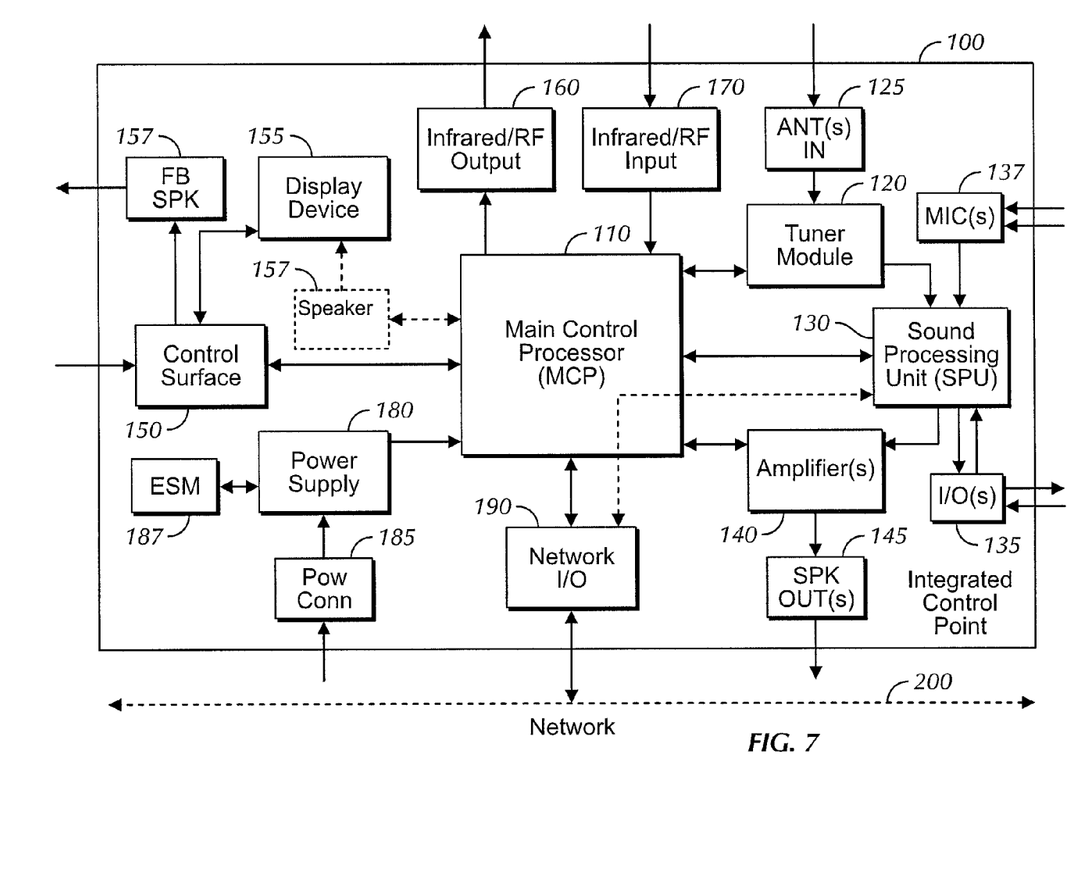
FIG. 7 is a block diagram of components of the integrated control point node of FIG. 6.

FIG. 7 is a block diagram of components of the integrated control point node 100 of FIG. 6. Externally accessible, visually or physically, on the ICPN 100 is a control surface 150 consisting of a button keypad 154 and a LCD 155. Also accessible on the surface 150 are microphone 137 and infrared transceivers 160, 170. The control surface 150 provides a means for physically controlling the audio system and sources via button keypad 154 presses, voice control through the microphone 137, or sensory input via electronic sensors such as the passive infrared transceivers 160, 170, ambient light sensors or external sensors. Also, the control surface 150 can provide a visual via display device, 155 or an audible feedback via speaker 157 to aid with the use and control of the ICPN 100. The IR transceivers 160, 170 facilitate infrared and radio frequency input and output for use from remote controlled devices. These devices can extend the functionality of the ICPN 100 to a small handheld type device.

In addition, FIG. 7 shows other components mounted behind the control surface 150 inside the ICPN 100. A main control processor (MCP) 110 functions to control audio output of the ICPN 100 and possesses a memory that can be Flash upgradeable for future functionality. Connected to the MCP 110 is an FM tuner 120 also connected to an antenna input connection 125 which receives audio signals from the antenna 300. The integrated tuner 120 has provisions for both a single antenna or a plurality of antennas, commonly known as diversity tuning. Controlling the tuner 120 directly are control signals from the MCP 110 to provide selected audio output signals to a sound processing unit 130. The control signals are provided by the MCP 110 in response to command signals produced on the control surfaces 150 by a user of the system. In addition, the sound processing unit (SPU) 130 also receives from a microphone 137 input for use both in processing data such as for voice control applications and also for use with adaptive room correctional algorithms. The microphone 137 also can be used in calculating installation placement and triangulation, speaker polarity and placement and for use with intercom and/or VoIP capabilities.

The SPU 130 also receives, processes, and routes analog and digital audio signals from an audio I/O connection 135 communicating with the audio I/O 500 as well as analog and digital audio signals from the network I/O 190 associated with the Network 200. The SPU 130 also processes and produces analog and digital audio signals routed to the audio I/O connect 135, network I/O 190, and to an integrated amplifier 140. Controlled by the MCP 110, the amplifier 140 provides its amplified audio output signal to speaker output connectors 145. The MCP 110 also receives processes, and routes Infrared and radio frequency serial data via an infrared transceiver circuit 170 and creates and transmits infrared or radio frequency serial data via an infrared transmission circuit 160. In addition, the MCP 110 is connected to the Network 200 via the Network I/O circuit 190.

The MCP 110 is powered by a power supply circuit 180 connected to the local or global power supply 600 via a power connection 185. In the preferred embodiment of the ICPN 100, the power supply 180 is further enhanced by the use of an energy storage module (ESM) 187, which allows for quick transience response and helps the local or global power supply 600 deliver a steady level of power for the audio system to utilize and improve system performance.

The control surface 150 of the ICPN 100 is controlled and communicates directly with the MCP 110. As shown in FIG. 6, the control surface 150 may consist of the button pad 154 but in some embodiments may consist of touch panel technology. The display device 155 is part of the control surface 150 and may be controlled directly by the MCP 110, or by a display controller 157 that is controlled by the MCP 110.

Figure 8:
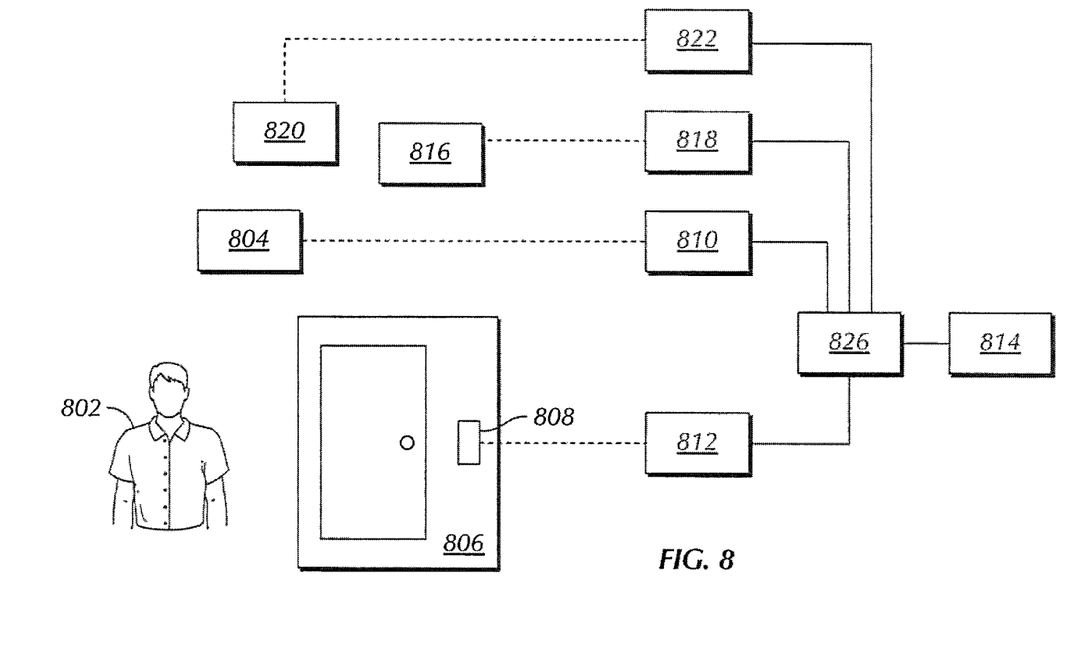
FIG. 8 illustrates the disclosed invention coupled to a building entry way.

FIG. 8 illustrates the disclosed invention coupled to an building entry way, and which uses a number of non-compatible systems that can be bridged to a unified communications system through the disclosed invention. In this example, the invention is using "presence" from the unified communication system to keep track of an employee ("John Smith") 802 as he enters the building. The disclosed invention will then be able to route all types messages to the employee while at the same time able to announce his presence (and location) to the unified communication system. Being able to identify the employee can occur in a number of ways. For example, the disclosed invention can use information from the employee's security badge on entry and then use an RFID embedded in the badge to track location inside the building. Another alternative would be to track the location of the employee's cell phone. To further expand on the identification of people, the disclosed invention could use a facial recognition system to identify people who do not possess a security badge.

Returning to FIG. 8, employee 802 is entering the facility through a secured door 806. Entry through the secured door 806 is through door security device 808 that can be for example a keypad, a badge reader, a fingerprint (or retinal) scanner, or a facial recognition scanner using a built-in camera. The door security device can also be an intelligent control device as described above. The door security device 808 couples to an entry security system 812.

The entry way also includes a video security camera 804 that provides surveillance of the entry way. The video security camera 804 can also have facial recognition ability as well. The video security camera 804 couples to a security system 810.

The entry way additionally includes an intelligent audio/video input/output device 816 as described above that connects to an audio/video distribution system 818.

The entry way further includes an intelligent light 820 that connects to building lighting control system 822. The light intensity of the intelligent light 820 can be adjusted remotely as needed so as to get a good picture of employee 802.

The building lighting control system 822, the audio/video distribution system 818, the security system 810, and the entry security system 812 all couple to the bridge 826 of the disclosed invention, which couples to a unified communication system 814.

With the disclosed invention, now that the employee's presence has been detected, messages such as audio pages or text messages can be sent to the employee so that they hear an audio page through the intelligent audio/video input/output device 816 or through the intelligent control node device 808.

Figure 9:
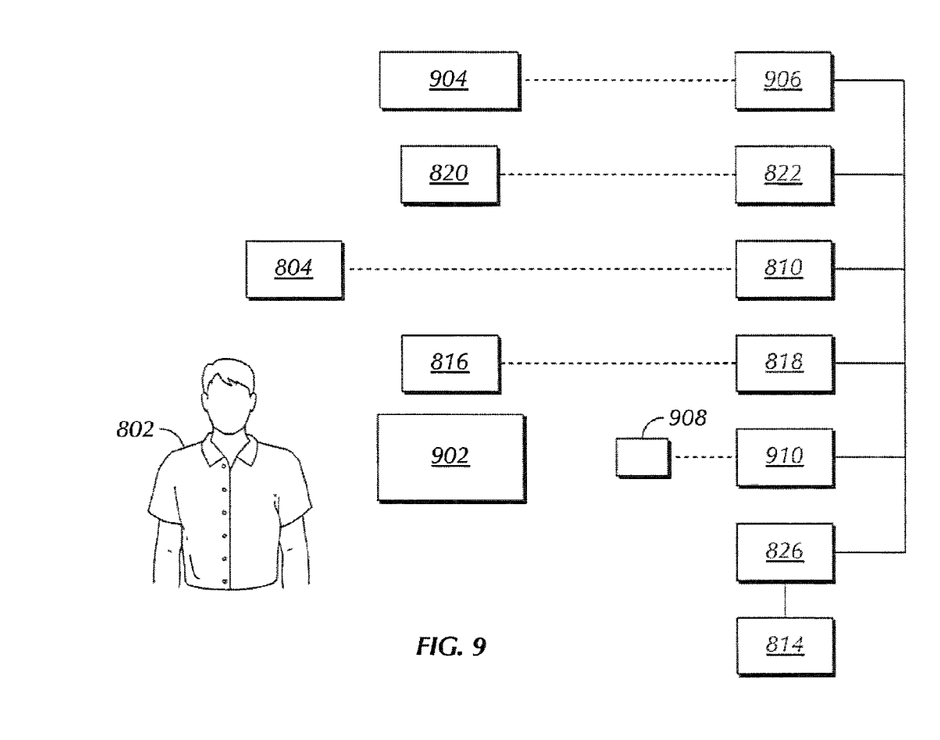
FIG. 9 illustrates the disclosed invention as an employee is traveling through a building hallway or is in a meeting area.

FIG. 9 illustrates the disclosed invention as the employee 802 is travelling through a building hallway or is in a meeting area. As described above, the disclosed bridge 826 keeps track of the employee's 802 location and provides that information to the unified communication system 814.

The video security camera 804 attached to a security system 810 keeps video surveillance of the employee.

The hallway or meeting room includes an the intelligent audio/video input/output device 816 as described above that connects to an audio/video distribution system 818.

The hallway or meeting room further includes an intelligent light 820 that connects to building lighting control system 822. The light intensity of the intelligent light 820 can be adjusted remotely as needed so as to get a good picture of employee 802 or help to control the energy usage of the building.

The hallway or meeting room additionally includes an intelligent HVAC node 904 (that includes a vent system) that couples to the building HVAC control system 906.

Additionally, the hallway meeting room includes an intelligent control device 908 that couples to an interior security system 910.

The HVAC control system 906, the building lighting control system 822, the audio/video distribution system 818, the security system 810, and interior security system 910 all couple to the bridge 826 of the disclosed invention, which couples to a unified communication system 814.

This disclosure describes a bridge and control proxy for unified communication systems. The bridge transmits and receives data from a unified communication system. In addition, the bridge transmits and receives data from a non-compatible device. The bridge translates the data between the unified communication system and the non-compatible device. The bridge stores selected data such as presence information for later use by the unified communication system and/or the non-compatible device.

Further, the bridge uses Web services to discover, promote, and/or advertise non-compatible devices to the unified communication system.

Other embodiments of the present invention will be apparent to those skilled in the art after considering this disclosure or practicing the disclosed invention. The specification and examples above are exemplary only, with the true scope of the present invention being determined by the following claims.

We claim:

1. A method of operating a communication system, the method comprising:
   transmitting compatible data to and receiving compatible data from a unified communication system with a bridge and control proxy;
   transmitting non-compatible data to and receiving non-compatible data from an audio/video distribution system that is not compatible with a unified communication system with the bridge and control proxy;
   translating the non-compatible data to compatible data and translating the compatible data to non-compatible data with the bridge and control proxy to enable bi-directional communication between the unified communication system and the non-compatible device;
   storing selected data in the bridge and control proxy for later use by at least one of the unified communication system and the audio/video distribution system, comprising storing presence information of one or more people; and
   coordinating the compatible data and the non-compatible data to track location of the one or more people inside of a building,
   wherein the presence information of the one or more people is detected by the audio/video distribution system, announced on the unified communication system, and messages for the one or more people are sent from the unified communication system to the audio/video distribution system.

2. The method of claim 1, further comprising utilizing the bridge and control proxy to perform at least one act selected from the group consisting of discovering, promoting, and advertising non-compatible devices to the unified communication system.

3. A method of operating a communication system, the method comprising:
   utilizing a bridge and control proxy to transmit and receive data from a unified communication system with a network connection;
   utilizing the bridge and control proxy to transmit and receive data from a non-compatible device communication with a non-network type serial connection;
   utilizing the bridge and control proxy to translate the data between the unified communication system and the non-compatible device and enable bi-directional communication between the unified communication system and the non-compatible device;
   storing selected data on the bridge and control proxy for later use by at least one of the unified communication system and the non-compatible device, comprising storing presence information of one or more people; and
   coordinating the data from the unified communication system and the data from the non-compatible device to track location of the one or more people inside of a building,
   wherein the presence information of the one or more people is detected by the non-compatible device, announced on the unified communication system, and messages for the one or more people are sent from the unified communication system to the non-compatible device.

4. The method of claim 3, further comprising at least one act selected from the group consisting of discovering, promoting, and advertising non-compatible devices to the unified communication system.

5. A method of operating a communication system, the method comprising:
utilizing a bridge and control proxy to receive data from a unified communication system through a network interface, translate the data to a form compatible with a non-compatible device, and transmit the translated data to the non-compatible device through a non-network serial interface;
utilizing the bridge and control proxy to receive other data from the non-compatible device through the non-network serial interface, translate the other data to a form compatible with the unified communication system, and transmit the translated other data to the unified communication system through the network interface;
storing selected data in the bridge and control proxy for later use by at least one of the unified communication system and the non-compatible device, comprising storing presence information of one or more people; and
coordinating the data and the other data to track location of the one or more people inside of a building,
wherein the presence information of the one or more people is detected by the non-compatible device, announced on the unified communication system, and messages for the one or more people are sent from the unified communication system to the non-compatible device.

6. A bridge and control proxy, comprising:
a network interface configured to transmit data to and receive data from a unified communication system in a format compatible with the unified communication system and transmit data to and receive data from a non-compatible audio/video distribution system in a format incompatible with the unified communication system;
a computing device configured to cause the data between the unified communication system and the audio/video distribution system to be translated between the compatible format and the non-compatible format and communicated bi-directionally between the unified communication system and the audio/video distribution system; and
a storage device configured to store selected data for later use by at least one of the unified communication system and the audio/video distribution system, comprising storing presence information of one or more people;
the computing device further configured to coordinate the data between the unified communication system and the audio/video distribution system to track location of the one or more people inside of a building,
wherein the presence information of the one or more people is detected by the audio/video distribution system, announced on the unified communication system, and messages for the one or more people are sent from the unified communication system to the audio/video distribution system.

7. The bridge and control proxy of claim 6, further comprising one or more application servers configured to provide communication between the unified communication system and the non-compatible device.

8. A communication system, comprising:
a unified communication system;
one or more non-compatible devices; and
a bridge and control proxy configured to:
electrically communicate with the unified communication system in a compatible format; and
electrically communicate with the one or more non-compatible devices with a non-network type serial connection and in a non-compatible format, and translate data from the unified communication system and the one or more non-compatible devices to enable bi-directional communication between the unified communication system and the one or more non-compatible devices, the bridge and control proxy further configured to store selected data on a storage device for later use by at least one of the unified communication system and the one or more non-compatible devices, comprising storing presence information of one or more people; and
coordinate the data between the unified communication system and the one or more non-compatible devices to track location of the one or more people inside of a building,
wherein the presence information of the one or more people is detected by the one or more non-compatible devices, announced on the unified communication system, and messages for the one or more people are sent from the unified communication system to the one or more non-compatible devices.

9. The communication system of claim 8, wherein the one or more non-compatible devices comprises at least one device selected from the group consisting of a heating, ventilation, and air conditioning (HVAC) system, a security system, and an audio-video distribution system.

10. The communication system of claim 8, wherein the unified communication system comprises one or more components selected from the group consisting of an email server, a fax server, a telephone system, an instant messaging system, and a digital presence system.

11. The communication system of claim 10, wherein the telephone system comprises a voicemail system and a video teleconferencing system.

12. The communication system of claim 10, wherein at least one of the one or more components is configured to communicate as part of a cloud network.

13. The communication system of claim 8, wherein the one or more non-compatible devices are configured to communicate with the bridge and control proxy through at least one connection selected from the group consisting of a local area network (LAN) connection, a wide area network (WAN) connection, a serial connection, a direct connection, a universal serial bus (USB) connection, and an infrared (IR) connection.

14. The communication system of claim 8, further comprising an intelligent agent device configured to provide voice to text and text to voice conversion.

* * * * *